United States Patent
Lin (10) Patent No.: US 11,568,525 B2
(45) Date of Patent: Jan. 31, 2023

(54) MOIRÉ IMAGE PROCESSING DEVICE

(71) Applicant: inFilm Optoelectronic Inc., Grand Cayman (KY)

(72) Inventor: Chih-Hsiung Lin, Grand Cayman (KY)

(73) Assignee: inFilm Optoelectronic Inc., Grand Cayman (KY)

( * ) Notice: Subject to any disclaimer, the term of this patent is extended or adjusted under 35 U.S.C. 154(b) by 240 days.

(21) Appl. No.: 17/113,493

(22) Filed: Dec. 7, 2020

(65) Prior Publication Data

US 2021/0183031 A1    Jun. 17, 2021

(30) Foreign Application Priority Data

Dec. 17, 2019    (CN) .......................... 201911298599.0

(51) Int. Cl.
  *G06T 5/20*    (2006.01)
  *G02B 30/27*    (2020.01)
  *B42D 25/342*    (2014.01)

(52) U.S. Cl.
  CPC .............. *G06T 5/20* (2013.01); *B42D 25/342* (2014.10); *G02B 30/27* (2020.01)

(58) Field of Classification Search
  CPC ...... G06T 5/20; B42D 25/342; B42D 25/324; G02B 30/27; G02B 3/0043; G02B 3/0068; G02B 27/60; G06V 10/147; H04N 5/2253; H04N 5/2254; H04N 5/232
  See application file for complete search history.

(56) References Cited

U.S. PATENT DOCUMENTS

| | | | | |
|---|---|---|---|---|
| 9,945,988 B2* | 4/2018 | Powell | .................. | G02B 30/56 |
| 10,884,251 B2* | 1/2021 | Karafin | .................. | G02B 6/10 |
| 11,169,387 B2* | 11/2021 | Tillkorn | .............. | G02B 27/285 |
| 11,204,450 B2* | 12/2021 | Shen | ..................... | G02B 7/023 |

(Continued)

OTHER PUBLICATIONS

Kim Y, Park G, Jung JH, Kim J, Lee B. Color moiré pattern simulation and analysis in three-dimensional integral imaging for finding the moiré-reduced tilted angle of a lens array. Appl Opt. Apr. 10, 2009;48(11):2178-87. doi: 10.1364/ao.48.002178. PMID: 19363558. (Year: 2009).*

*Primary Examiner* — Andrae S Allison
(74) *Attorney, Agent, or Firm* — Rabin & Berdo, P.C.

(57) ABSTRACT

A moiré image processing device is provided, including a light-transmitting film, a light sensor, and an image processor. The light-transmitting film includes a plurality of microlenses, and a light-incident surface and a light-exit surface, where the microlenses are disposed on the light-incident surface, the light-exit surface, or a combination thereof according to a distribution pattern. The light sensor includes a photosensitive surface, where the photosensitive surface faces the light-exit surface, there are a plurality of pixels on the photosensitive surface, and the pixels sense the microlenses to obtain a photosensitive image corresponding to the distribution pattern. The image processor is coupled to the light sensor, where the image processor performs, according to a virtual image and the photosensitive image, image processing of simulating a moiré effect to generate a moiré image, where the virtual image corresponds to the distribution pattern and is similar to the photosensitive image.

12 Claims, 7 Drawing Sheets

(56) References Cited

U.S. PATENT DOCUMENTS

| | | | |
|---|---|---|---|
| 2010/0079861 A1* | 4/2010 | Powell | G03B 21/60 |
| | | | 359/449 |
| 2013/0194482 A1* | 8/2013 | Nicol | G06F 30/00 |
| | | | 348/340 |
| 2017/0113481 A1* | 4/2017 | Hersch | G02B 3/0006 |
| 2017/0261651 A1* | 9/2017 | Powell | G02B 3/0062 |
| 2018/0095275 A1* | 4/2018 | Nakajima | G02B 27/646 |
| 2018/0166489 A1* | 6/2018 | Sao | H01L 27/14685 |

* cited by examiner

MOIRÉ IMAGE PROCESSING DEVICE

CROSS-REFERENCE TO RELATED APPLICATION

This non-provisional application claims priority under 35 U.S.C. § 119(a) to Patent Application No. 201911298599.0 filed in China, P.R.C. on Dec. 17, 2019, the entire contents of which are hereby incorporated by reference.

BACKGROUND

Technical Field

The instant disclosure relates to an image processing device, and in particular, to a moiré image processing device.

Related Art

With the rapid development of multimedia technologies, many electronic devices (such as smartphones, tablet computers, notebook computers, or digital cameras) are equipped with optical lens assemblies, for example, the optical lens assembly may be a wide-angle lens assembly, a fisheye lens assembly, or a zoom lens assembly, to support functions such as photography, online video, or face recognition.

However, at present, the optical lens assembly on the market usually includes a plurality of optical lenses. For example, the optical lens may be a concave lens or a convex lens. As a result, the optical lens assembly cannot be further thinned. For example, the thicknesses of most of the optical lenses of the smartphones and the tablet computers are more than 5 mm, and the thicknesses of most of the optical lens assemblies of the digital cameras are more than 50 mm, which is adverse to the thinning development of the electronic devices.

SUMMARY

In an embodiment, a moiré image processing device is provided, including a light-transmitting film, a light sensor, and an image processor. The light-transmitting film includes a plurality of microlenses, and a light-incident surface and a light-exit surface that are opposite to each other, where the microlenses are disposed on the light-incident surface, the light-exit surface, or a combination thereof according to a distribution pattern. The light sensor includes a photosensitive surface, where the photosensitive surface faces the light-exit surface of the light-transmitting film, there are a plurality of pixels on the photosensitive surface, and the pixels sense the microlenses to obtain a photosensitive image corresponding to the distribution pattern. The image processor is coupled to the light sensor, where the image processor performs, according to a virtual image and the photosensitive image, image processing of simulating a moiré effect to generate a moiré image, where the virtual image corresponds to the distribution pattern and is similar to the photosensitive image.

In another embodiment, a moiré image processing device is provided, including a light-transmitting film, a light sensor, and an image processor. The light-transmitting film includes a plurality of first microlenses, a plurality of second microlenses, and a light-incident surface and a light-exit surface that are opposite to each other, where the first microlenses are disposed on the light-incident surface, the light-exit surface, or a combination thereof according to a first distribution pattern, the second microlenses are disposed on the light-incident surface, the light-exit surface, or a combination thereof according to a second distribution pattern, and the first distribution pattern is different from the second distribution pattern. The light sensor includes a photosensitive surface, where the photosensitive surface faces the light-exit surface of the light-transmitting film, there are a plurality of pixels on the photosensitive surface, and the pixels sense the first microlenses to obtain a first photosensitive image corresponding to the first distribution pattern and sense the second microlenses to obtain a second photosensitive image corresponding to the second distribution pattern. The image processor is coupled to the light sensor, where the image processor selectively performs, according to a first virtual image and the first photosensitive image, image processing of simulating a moiré effect to generate a first moiré image or selectively performs, according to a second virtual image and the second photosensitive image, image processing of simulating a moiré effect to generate a second moiré image, where the first virtual image corresponds to the first distribution pattern and is similar to the first photosensitive image, and the second virtual image corresponds to the second distribution pattern and is similar to the second photosensitive image.

Concisely, in the moiré image processing device of the embodiments of the instant disclosure, at least one microlens assembly is disposed on the light-transmitting film, and the image processor performs image processing of simulating a moiré effect on the virtual image and the photosensitive image that is generated by the light sensor by sensing the microlens assembly, to generate a moiré image and achieve an image magnification effect, thereby maintaining existing image shooting and capturing functions while greatly thinning the moiré image processing device in terms of overall design to make a thickness thereof far less than that of an optical lens assembly on the current market. In addition, a plurality of microlens assemblies having different distribution patterns may be disposed on a single light-transmitting film, so that the moiré image processing device can selectively generate, according to different use requirements, moiré images having different magnifications without increasing the thickness or volume, thereby greatly improving functionality of the moiré image processing device.

The following describes the instant disclosure in detail with reference to the accompanying drawings and specific embodiments, but should not be used as a limitation on the instant disclosure.

DETAILED DESCRIPTION

The following provides detailed descriptions of various embodiments. However, the embodiments are merely used as an example for description and are not intended to narrow the protection scope of the instant disclosure. In addition, some elements may be omitted in the accompanying drawings in the embodiments, to clearly show technical features of the instant disclosure. Identical labels in all accompanying drawings are used to represent the same or similar elements.

Figure 1:
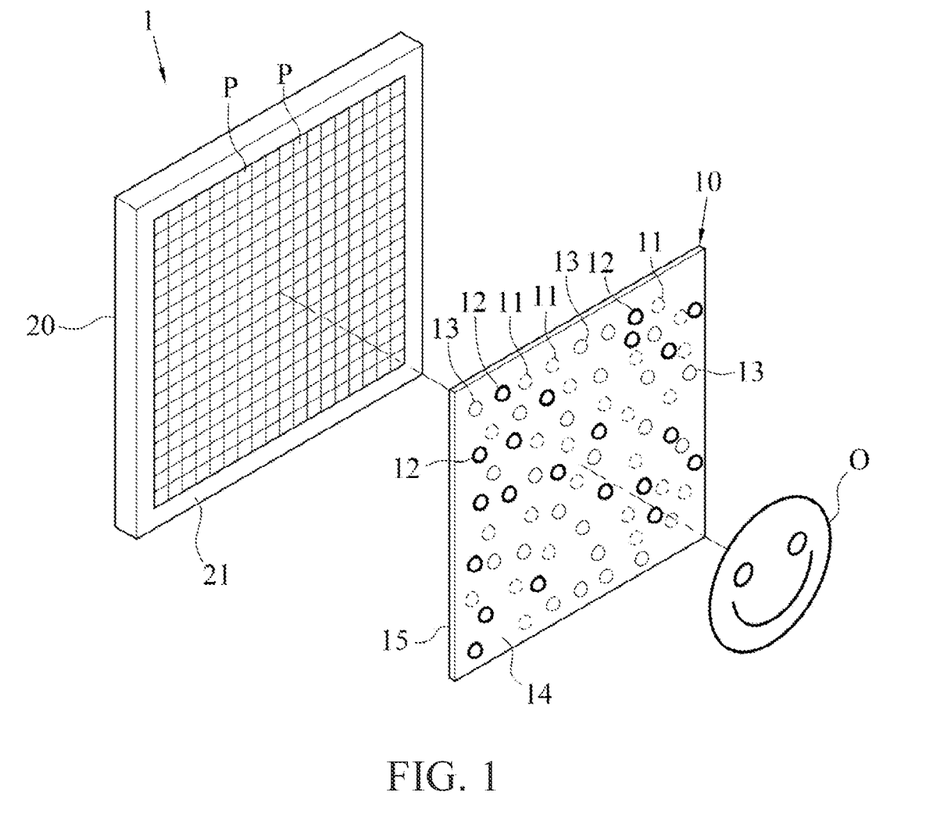
FIG. 1 illustrates a three-dimensional view of an embodiment of a moiré image processing device according to the instant disclosure.
Figure 2:
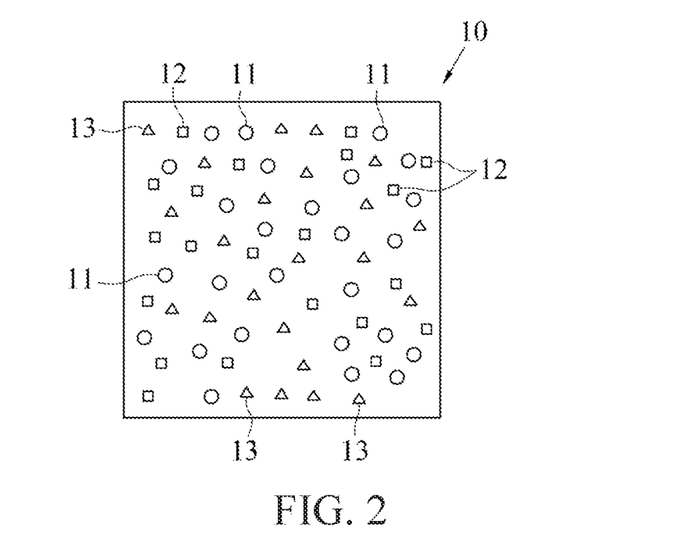
FIG. 2 illustrates a schematic plan view of an embodiment of a light-transmitting film according to the instant disclosure.
Figure 3:
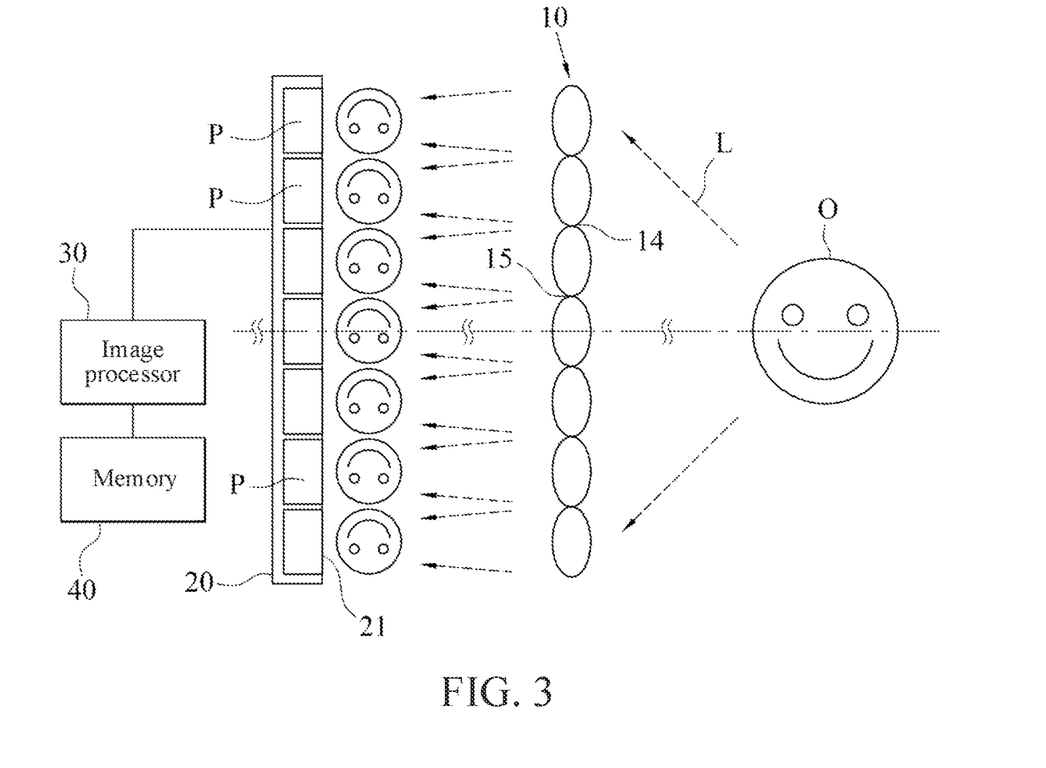
FIG. 3 illustrates a schematic diagram of light sensing of an embodiment of a moiré image processing device according to the instant disclosure.

FIG. 1 is a three-dimensional view of an embodiment of a moiré image processing device according to the instant disclosure, FIG. 2 is a schematic plan view of an embodiment of a light-transmitting film according to the instant disclosure, and FIG. 3 is a schematic diagram of light sensing of an embodiment of a moiré image processing device according to the instant disclosure. As shown in FIG. 1 to FIG. 3, a moiré image processing device 1 in this embodiment of the instant disclosure includes a light-transmitting film 10, a light sensor 20, and an image processor 30. The moiré image processing device 1 may be applied to various electronic products (such as smartphones, tablet computers, notebook computers, digital cameras, or video cameras) to obtain images of objects.

As shown in FIG. 1, the light-transmitting film 10 may be a film or a sheet made of a light-transmitting material. For example, the light-transmitting material may be polycarbonate (PC) or poly(methyl methacrylate) (PMMA), and the thickness of the light-transmitting film 10 may be from 5 µm to 1000 µm. However, the light-transmitting material and the thickness of the light-transmitting film 10 are merely examples, and the instant disclosure is not actually limited thereto.

As shown in FIG. 1, the light-transmitting film 10 includes two opposite surfaces (a light-incident surface 14 and a light-exit surface 15), and at least one microlens assembly may be disposed on a surface of the light-transmitting film 10. For example, in this embodiment, three microlens assemblies are disposed on the surface of the light-transmitting film 10, where the first microlens assembly includes a plurality of first microlenses 11, the second microlens assembly includes a plurality of second microlenses 12, and the third microlens assembly includes a plurality of third microlenses 13. To clearly distinguish and differentiate disposition positions of the three groups of microlenses (the first microlenses 11, the second microlenses 12, and the third microlenses 13), the three different groups of microlenses are respectively represented by different line types in FIG. 1. For example, in this embodiment, the first microlenses 11 are represented by dashed lines, the second microlenses 12 are represented by thick lines, and the third microlenses 13 are represented by thin lines.

As shown in FIG. 1, the plurality of first microlenses 11 are disposed on the light-incident surface 14, the light-exit surface 15, or both of the surfaces of the light-transmitting film 10 according to a first distribution pattern, the plurality of second microlenses 12 are disposed on the light-incident surface 14, the light-exit surface 15, or both of the surfaces of the light-transmitting film 10 according to a second distribution pattern, the plurality of third microlenses 13 are disposed on the light-incident surface 14, the light-exit surface 15, or both of the surfaces of the light-transmitting film 10 according to a third distribution pattern, and the first distribution pattern, the second distribution pattern, and the third distribution pattern are different from each other. Specifically, as shown in FIG. 1, in this embodiment, the plurality of first microlenses 11, the plurality of second microlenses 12, and the plurality of third microlenses 13 are irregularly distributed on the light-incident surface 14 of the light-transmitting film 10 and are staggered without overlapping each other, so that the plurality of first microlenses 11, the plurality of second microlenses 12, and the plurality of third microlenses 13 respectively present different distribution patterns. In other embodiments, the plurality of first microlenses 11, the plurality of second microlenses 12, and the plurality of third microlenses 13 may alternatively be respectively distributed on different surfaces of the light-transmitting film 10, or the plurality of first microlenses 11, the plurality of second microlenses 12, and the plurality of third microlenses 13 may alternatively be respectively distributed in different patterns. No limitation is imposed herein.

With reference to FIG. 1 and FIG. 2, to present the foregoing distribution patterns more clearly, in FIG. 2, different microlenses are represented by patterns in different shapes, but shapes of the microlenses are not limited, which should be explained first. For example, in the embodiment of FIG. 2, the first microlenses 11 are represented by circular patterns, the second microlenses 12 are represented by square patterns, and the third microlenses 13 are represented by triangular patterns. It can be obviously seen from FIG. 2 that a pattern in which a plurality of circular patterns are distributed (that is, the foregoing first distribution pattern), a pattern in which a plurality of square patterns are distributed (that is, the foregoing second distribution pattern), and a pattern in which a plurality of triangular patterns are distributed (that is, the foregoing third distribution pattern) are different. In some embodiments, the plurality of first microlenses 11, the plurality of second microlenses 12, and the plurality of third microlenses 13 may alternatively be regularly arranged (for example, be arranged as an array or arranged linearly), which is not limited in this embodiment.

In some embodiments, sizes of the first microlenses 11, the second microlenses 12, and the third microlenses 13 may be respectively between 2 µm and 2000 µm. A material of the first microlenses 11, the second microlenses 12, and the third microlenses 13 is a transparent material such as fused silica, optical glass, or transparent plastic. The first microlenses 11, the second microlenses 12, and the third microlenses 13 may be respectively columnar lenses, convex lenses, concave lenses, or other types of optical lenses. The first microlenses 11, the second microlenses 12, and the third microlenses 13 may be manufactured and shaped integrally with the light-transmitting film 10. Alternatively, the first microlenses 11, the second microlenses 12, and the third microlenses 13 may be formed in other processing manners. For example, the processing manner may be screen printing, relief casting, photoresist reflux, micro-injection molding, hot embossing, or the like. However, the sizes, the distribution manners, or the processing manners of the first microlenses 11, the second microlenses 12, and the third microlenses 13 are merely examples, and specifically depends on a product to which the moiré image processing device 1 is applied.

As shown in FIG. 1 to FIG. 3, the light sensor 20 includes a photosensitive surface 21. A spacing is kept between the light sensor 20 and the light-transmitting film 10, and the photosensitive surface 21 faces the light-exit surface 15 of the light-transmitting film 10, so that light exiting from the light-exit surface 15 can be transmitted to the photosensitive surface 21 of the light sensor 20. In this embodiment, the photosensitive surface 21 of the light sensor 20 includes a plurality of pixels configured to obtain an image through light sensing. In some embodiments, the foregoing light sensor 20 may be specifically a photosensitive element such as a charge-coupled device (CCD), a complementary metal-oxide semiconductor (CMOS), or a CMOS active pixel sensor.

Figure 4:
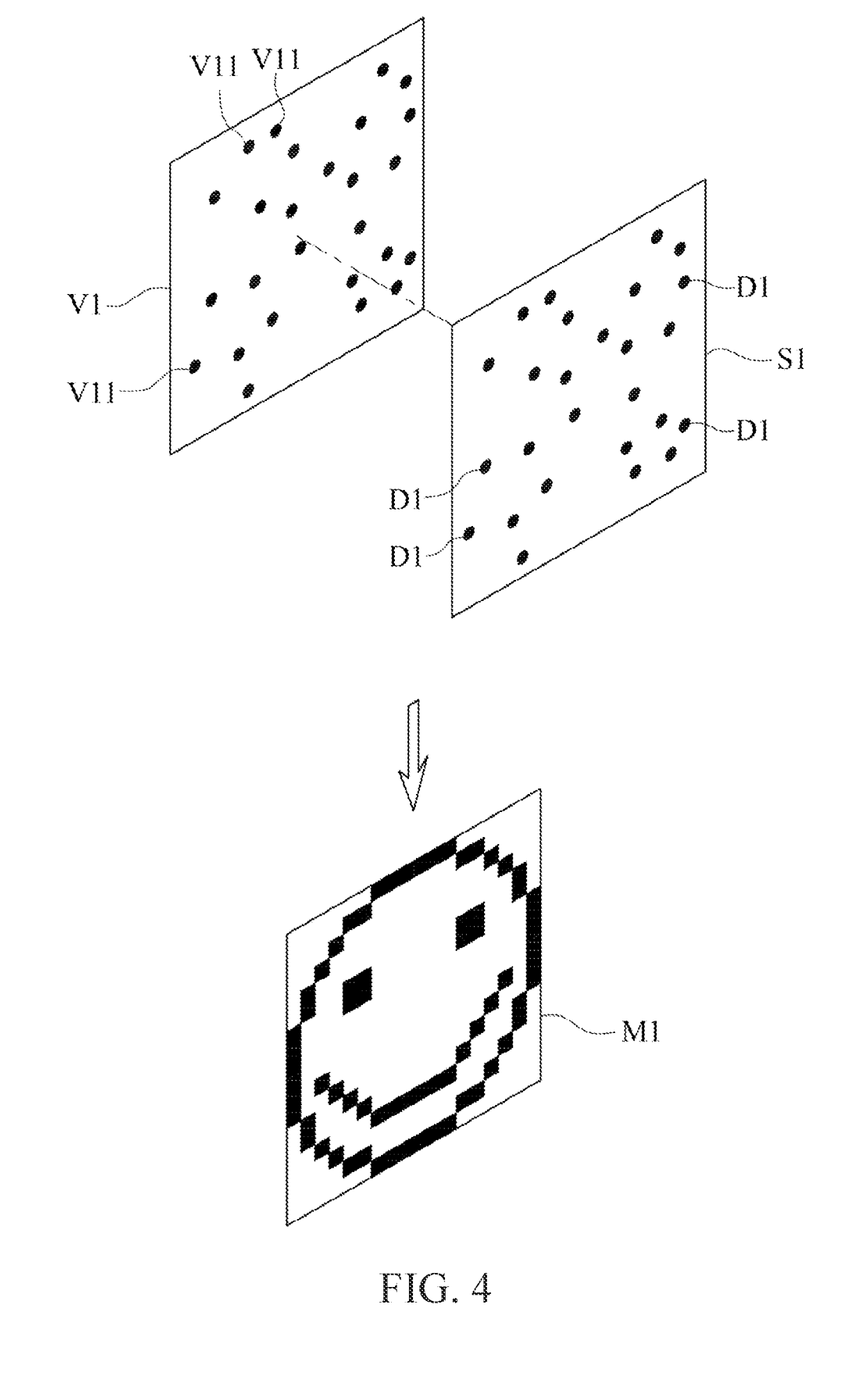
FIG. 4 illustrates a schematic diagram of imaging of an embodiment of a moiré image processing device according to the instant disclosure.

A plurality of pixels P of the light sensor 20 may sense the first microlenses 11 to obtain a first photosensitive image S1 corresponding to the first distribution pattern, sense the second microlenses 12 to obtain a second photosensitive image S2 corresponding to the second distribution pattern, and sense the third microlenses 13 to obtain a third photosensitive image S3 corresponding to the third distribution pattern. For example, with reference to FIG. 1 and FIG. 3, in an image shooting or capturing process of the moiré image processing device 1, object light L produced by an external object O (in this example, the external object O is represented by a smiling face) may enter the interior of the light-transmitting film 10 from the light-incident surface 14 of the light-transmitting film 10, exit from the light-exit surface 15 after being refracted by the plurality of microlenses (for example, the first microlenses 11, the second microlenses 12, and the third microlenses 13), and be transmitted to the plurality of pixels P of the light sensor 20 respectively, so that the plurality of pixels P sense light respectively obtain a plurality of image regions. As shown in FIG. 3, in this embodiment, the image regions obtained by the pixels P are represented by small smiling faces corresponding to the object O. Because three microlens assemblies are disposed on the light-transmitting film 10, the object light L is refracted by the first microlens assembly (the plurality of first microlenses 11) respectively, exits from the light-exit surface 15, and is transmitted respectively to the plurality of pixels P corresponding to the light sensor 20, so that the light sensor 20 can sense the object light L to obtain the first photosensitive image S1. As shown in FIG. 4, the first photosensitive image S1 may include a plurality of first image regions D1 (represented by circular dots herein) corresponding to positions of the plurality of first microlenses 11, to constitute a first distribution pattern having the plurality of first image regions D1 corresponding to the plurality of first microlenses 11.

Figure 5:
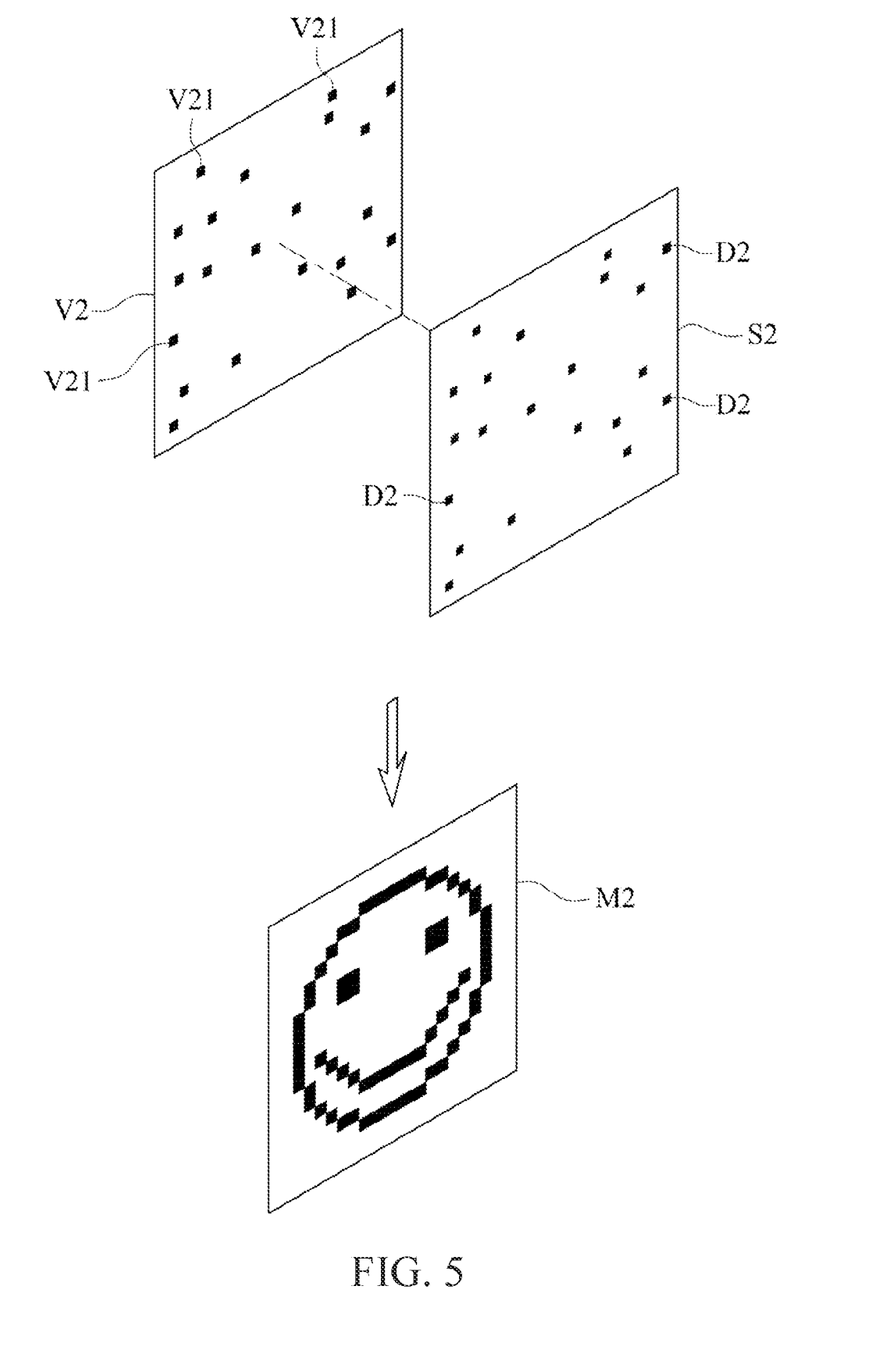
FIG. 5 illustrates a schematic diagram of imaging of an embodiment of a moiré image processing device according to the instant disclosure.
Figure 6:
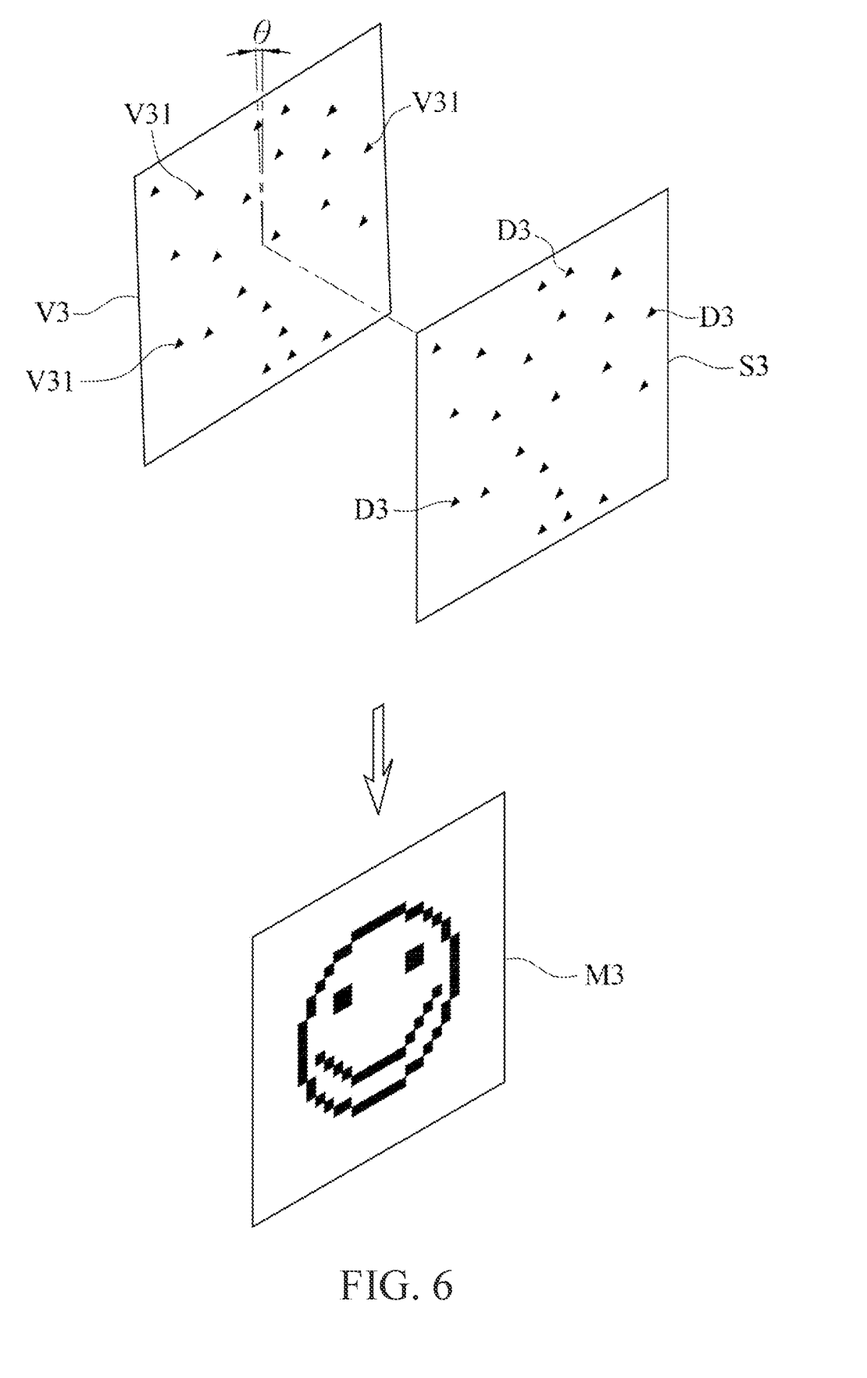
FIG. 6 illustrates a schematic diagram of imaging of an embodiment of a moiré image processing device according to the instant disclosure.

Similarly, the object light L emitted from the object O is also refracted by the second microlens assembly (the plurality of second microlens 12) and the third microlens assembly (the plurality of third microlenses 13) respectively, exits from the light-exit surface 15, and is transmitted respectively to the plurality of pixels P corresponding to the light sensor 20, so that the light sensor 20 can sense the object light L to obtain the second photosensitive image S2 and the third photosensitive image S3. As shown in FIG. 5, the second photosensitive image S2 includes a plurality of second image regions D2 (represented by square dots herein) corresponding to positions of the plurality of second microlenses 12, to constitute a second distribution pattern having the plurality of second image regions D2 corresponding to the plurality of second microlenses 12. As shown in FIG. 6, the third photosensitive image S3 includes a plurality of third image regions D3 (represented by triangular dots herein) corresponding to positions of the plurality of third microlenses 13, to constitute a third distribution pattern having the plurality of third image regions D3 corresponding to the plurality of third microlenses 13.

As shown in FIG. 3, the image processor 30 is coupled to the light sensor 20, and is configured to perform processing on an image sensed by the light sensor 20. In some embodiments, the image processor 30 may be a central processing unit (CPU) equipped with a computing capacity, a micro control unit (MCU), a micro processing unit (MPU), a graphic processing unit (GPU), or the like.

The image processor 30 may selectively perform, according to a virtual image and the first photosensitive image S1, the second photosensitive image S2, the third photosensitive image S3, or a combination thereof, image processing of simulating a moiré effect, to generate a moiré image corresponding to the object O. In addition, the first microlenses 11, the second microlenses 12, and the third microlenses 13 may be different microlenses respectively, for example, the first microlenses 11 are telephoto lenses, the second microlenses 12 are standard lenses, and the third microlenses 13 are microscope lens, so that after the image processor 30 performs image process of simulating a moiré effect on the first photosensitive image S1, the second photosensitive image S2, and the third photosensitive image S3 respectively, moiré images having different optical magnification effects may be generated, which is described below in detail with reference to the accompanying drawings.

With reference to FIG. 3 to FIG. 6, the image processor 30 may first respectively obtain a first virtual image V1 similar to the first photosensitive image S1, a second virtual image V2 similar to the second photosensitive image S2, and a third virtual image V3 similar to the third photosensitive image S3. As shown in FIG. 4, the first virtual image V1 may include a plurality of first virtual image regions V11 to correspond to the plurality of first image regions D1 of the first photosensitive image S1, and the image processor 30 may perform image superimposition on the first virtual image V1 and the first photosensitive image S1 to generate a moiré image corresponding to the object O.

For example, there may be a relative rotation angle between the first virtual image V1 and the first photosensitive image S1, or positions of the plurality of first virtual image regions V11 and positions of the first image regions D1 may shift relative to each other, or positions of the plurality of first virtual image regions V11 correspond to positions of the first image regions D1, but the plurality of first virtual image regions V11 and the plurality of first image regions D1 have different sizes (for example, the size of each first virtual image region V11 may be 0.99, 0.98, or 0.95 times the size of each first image region D1 or the size of each first virtual image region V11 may be 1.01, 1.02, or 1.05 times the size of each first image region D1, but the foregoing values are only examples, and are not used to limit the instant disclosure), to constitute a case that the first virtual image V1 is similar to, but not completely the same as, the first photosensitive image S1. For example, as shown in FIG. 4, in this embodiment, because positions of the plurality of first virtual image regions V11 of the first virtual image V1 and positions of the plurality of first image regions D1 of the first photosensitive image S1 shift relative to each other, when the image processor 30 performs image superimposition on the first virtual image V1 and the first photosensitive image S1, the plurality of first virtual image regions V11 of the first virtual image V1 and the plurality of first image regions D1 of the first photosensitive image S1 do not overlap each other at all, so that a moiré effect can be simulated and formed, thereby magnifying one of the first image regions D1 (as shown in FIG. 3, a small smiling face image herein) through the moiré effect to generate a first moiré image M1 (as shown in FIG. 4, a magnified smiling face image herein) corresponding to the object O.

Similarly, the image processor 30 may alternatively perform image processing according to the second virtual image V2 and the second photosensitive image S2, to generate a second moiré image M2 corresponding to the object O, or perform image processing according to the third virtual image V3 and the third photosensitive image S3 to generate a third moiré image M3 corresponding to the object O. As shown in FIG. 5 and FIG. 6, the second virtual image V2 may include a plurality of second virtual image regions V21 to correspond to the plurality of second image regions D2 of the second photosensitive image S2, and the third virtual images V3 may include a plurality of third virtual image regions V31 to correspond to the plurality of third image regions D3 of the third photosensitive image S3. The image processor 30 may perform image superimposition according to the second virtual image V2 and the second photosensitive image S2 to generate a second moiré image M2 corresponding to the object O, or selectively perform image superimposition according to the third virtual image V3 and the third photosensitive image S3 to generate a third moiré image M3 corresponding to the object O.

For example, there may be a relative rotation angle between the second virtual image V2 and the second photosensitive image S2, or positions of the plurality of second virtual image regions V21 and positions of the second image regions D2 may shift relative to each other, or positions of the plurality of second virtual image regions V21 correspond to positions of the second image regions D2, but the plurality of second virtual image regions V21 and the plurality of second image regions D2 have different sizes (for example, the size of each second virtual image region V21 may be 0.99, 0.98, or 0.95 times the size of each second image region D2 or the size of each second virtual image region V21 may be 1.01, 1.02, or 1.05 times the size of each second image region D2, but the foregoing values are only examples, and are not used to limit the instant disclosure), to constitute a case that the second virtual image V2 is similar to, but not completely the same as, the second photosensitive image S2. There may be a relative rotation angle between the third virtual image V3 and the third photosensitive image S3, or positions of the plurality of third virtual image regions V31 and positions of the third image regions D3 may shift relative to each other, or positions of the plurality of third virtual image regions V31 correspond to positions of the third image regions D3, but the plurality of third virtual image regions V31 and the plurality of third image regions D3 have different sizes (for example, the size of each third virtual image region V31 may be 0.99, 0.98, or 0.95 times the size of each third image region D3 or the size of each third virtual image region V31 may be 1.01, 1.02, or 1.05 times the size of each third image region D3, but the foregoing values are only examples, and are not used to limit the instant disclosure), to constitute a case that the third virtual image V3 is similar to, but not completely the same as, the third photosensitive image S3.

For example, as shown in FIG. 5, in this embodiment, because the size of each second virtual image region V21 of the second virtual image V2 is slightly greater than that of each second image region D2, when the image processor 30 performs image superimposition on the second virtual image V2 and the second photosensitive image S2, the plurality of second virtual image regions V21 of the second virtual image V2 and the plurality of second image regions D2 of the second photosensitive image S2 do not overlap each other at all, so that a moiré effect can be simulated and formed, thereby magnifying one of the second image regions D2 (as shown in FIG. 3, a small smiling face image herein) through the moiré effect to generate a second moiré image M2 (as shown in FIG. 5, a magnified smiling face image herein) corresponding to the object O. As shown in FIG. 6, in this embodiment, because there is a relative rotation angle θ between the third virtual image V3 and the third photosensitive image S3, when the image processor 30 performs image superimposition on the third virtual image V3 and the third photosensitive image S3, the plurality of third virtual image regions V31 of the third virtual image V3 and the plurality of third image regions D3 of the third photosensitive image S3 do not overlap each other at all, so that a moiré effect can be simulated and formed, thereby magnifying one of the third image regions D3 (as shown in FIG. 3, a small smiling face image herein) through the moiré effect to generate a third moiré image M3 (as shown in FIG. 6, a magnified smiling face image herein) corresponding to the object O.

Because the first microlenses 11, the second microlenses 12, and the third microlenses 13 may be respectively different microlenses (for example, the first microlenses 11 are telephoto lenses, the second microlenses 12 are standard lenses, and the third microlenses 13 are microscope lens), the first moiré image M1, the second moiré image M2, and the third moiré image M3 that are generated through the moiré effect have different magnifications, for which reference may be made to FIG. 4 to FIG. 6. In this embodiment, the smiling face shown in the first moiré image M1 is greater than the smiling face shown in the second moiré image M2, the smiling face shown in the second moiré image M2 is greater than the smiling face shown in the third moiré image M3, so that the moiré image processing device 1 can selectively generate moiré images having different magnifications according to different requirements.

In some embodiments, the image processor 30 may perform preprocessing respectively according to the first photosensitive image S1, the second photosensitive image S2, and the third photosensitive image S3 to obtain the first virtual image V1, the second virtual image V2, and the third virtual image V3 respectively, where the preprocessing may be image magnification, image rotation, or image shifting. For example, using FIG. 4 as an example, the image processor 30 may perform processing (for example, duplication) according to the first photosensitive image S1 to obtain an image the same as the first photosensitive image S1, and further perform image shifting on the positions of the plurality of first virtual image regions V11 of the image, to make the positions of the plurality of first virtual image regions V11 and the positions of the plurality of first image region D1 not overlap each other at all, thereby obtaining the first virtual image V1. Using FIG. 5 as an example, the image processor 30 may perform processing (for example, duplication) according to the second photosensitive image S2 to obtain an image the same as the second photosensitive image S2, and further perform image magnification on the plurality of second virtual image regions V21 in the image, to make the sizes of the plurality of second virtual image regions V21 greater than the sizes of the plurality of second image region D2, thereby obtaining the second virtual image V2. Using FIG. 6 as an example, the image processor 30 may perform processing (for example, duplication) according to the third photosensitive image S3 to obtain an image the same as the third photosensitive image S3, and further perform image rotation on the image, to make the image and third photosensitive image S3 have a relative rotation angle θ, thereby obtaining the third virtual image V3.

As shown in FIG. 3, in some embodiments, the moiré image processing device 1 further includes a memory 40. The memory 40 is coupled to the image processor 30 and pre-stores the first virtual image V1, the second virtual image V2, and the third virtual image V3. Therefore, the image processor 30 may directly read the memory 40 to obtain the first virtual image V1, the second virtual image V2, and the third virtual image V3, to selectively perform image processing on the first photosensitive image S1, the second photosensitive image S2, and the third photosensitive image S3 respectively, to reduce a volume of computing data of the image processor 30 and greatly improve the efficiency of image processing. In some embodiments, the memory 40 may be, for example, any type of fixed or movable random access memory (RAM), a read-only memory (ROM), a flash memory, a hard disk, or other similar devices or a combination of these devices.

Figure 7:
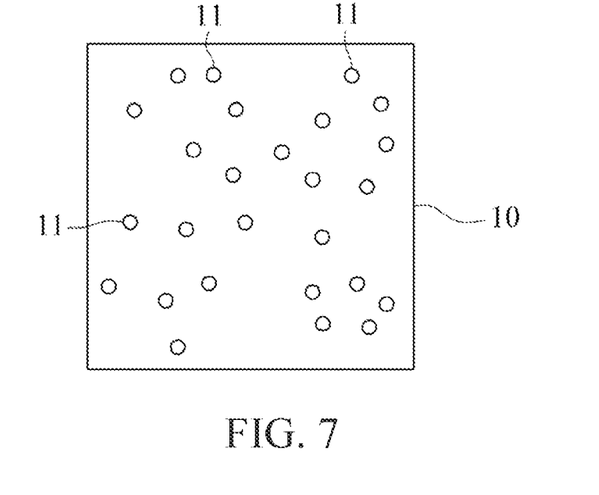
FIG. 7 illustrates a plan view of another embodiment of a light-transmitting film according to the instant disclosure.
Figure 8:
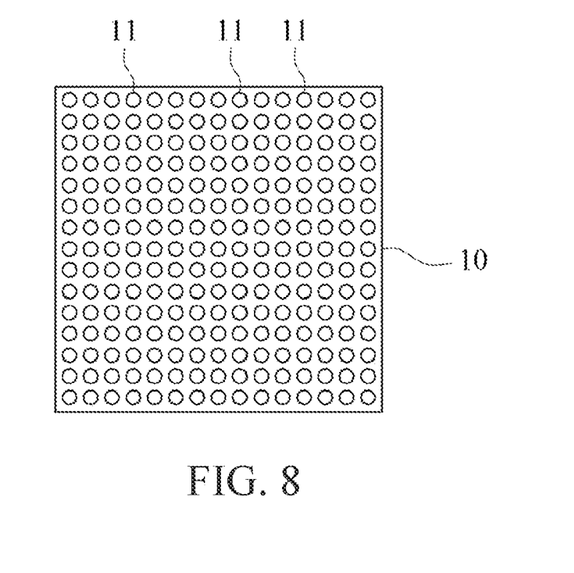
FIG. 8 illustrates a plan view of still another embodiment of a light-transmitting film according to the instant disclosure.

However, the foregoing embodiments are merely examples. In some embodiments, only one microlens assembly may be disposed on a surface of the light-transmitting film 10. As shown in FIG. 7, only a plurality of first microlenses 11 are disposed on the surface of the light-transmitting film 10, where the plurality of first microlenses 11 may be irregularly arranged, or as shown in FIG. 8, the plurality of first microlenses 11 may be regularly arranged (arranged as an array), which is not limited herein. Alternatively, in some embodiments, two microlens assemblies or over three microlens assemblies may be disposed on the surface of the light-transmitting film 10, to generate more moiré image having different magnifications.

Figure 9:
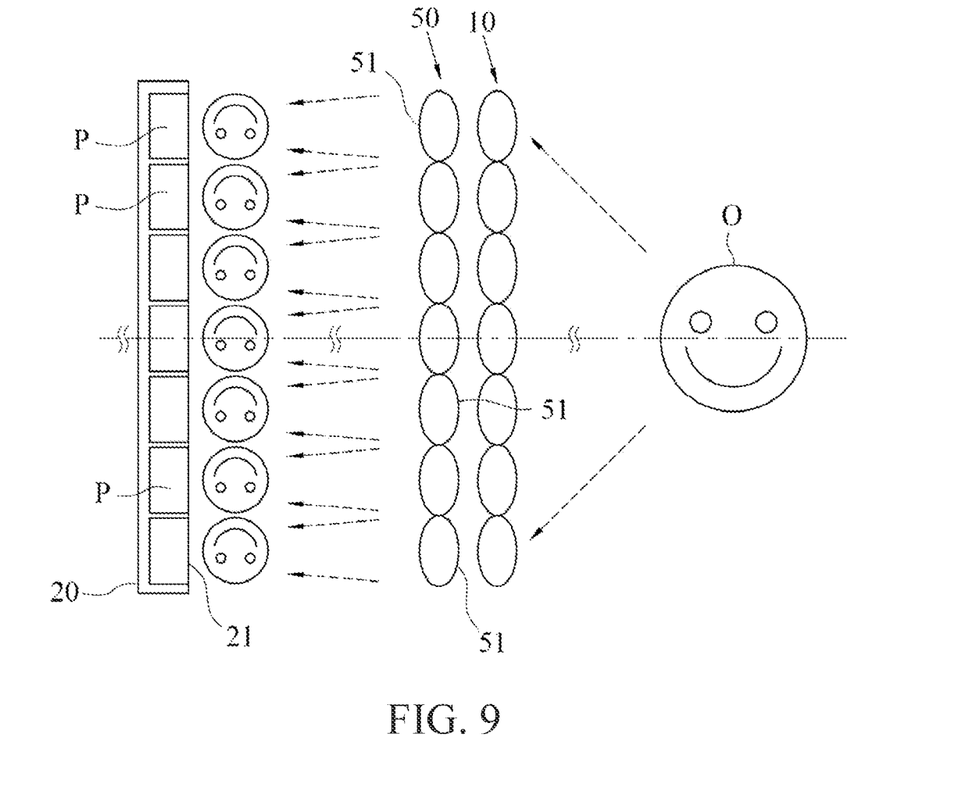
FIG. 9 illustrates a schematic diagram of light sensing of another embodiment of a moiré image processing device according to the instant disclosure.

With reference to FIG. 1 and FIG. 9, in this embodiment, the moiré image processing device 1 may further include a light-transmitting membrane 50, where the light-transmitting membrane 50 and the light-transmitting film 10 are coaxially disposed, the light-transmitting membrane 50 includes a plurality of optical microlenses 51, the optical microlenses 51 are disposed on a surface of the light-transmitting membrane 50 according to a distribution pattern, the pixels P of the light sensor 20 may also sense the optical microlenses 51 to obtain a photosensitive image corresponding to the distribution pattern, and the image processor 30 further performs, according to a virtual image and the photosensitive image, image processing to generate a moiré image corresponding to the object O. The specific image processing manner is the same as that in the embodiments of FIG. 1 to FIG. 6, and details are not described herein again.

In conclusion, in the moiré image processing device 1 of the embodiments of the instant disclosure, at least one microlens assembly is disposed on the light-transmitting film 10, and the image processor 30 performs image processing of simulating a moiré effect on the virtual image and the photosensitive image that is generated by the light sensor 20 by sensing the microlens assembly, to generate a moiré image and achieve an image magnification effect, thereby maintaining existing image shooting and capturing functions while greatly thinning the moiré image processing device 1 in terms of overall design to make a thickness thereof far less than that of an optical lens assembly on the current market. In addition, a plurality of microlens assemblies having different distribution patterns may be disposed on a single light-transmitting film 10, so that the moiré image processing device 1 can selectively generate, according to different use requirements, moiré images having different magnifications without increasing the thickness or volume, thereby greatly improving functionality of the moiré image processing device 1.

Although the instant disclosure has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A moiré image processing device, comprising:
a light-transmitting film, comprising a plurality of first microlenses, a plurality of second microlenses, and a light-incident surface and a light-exit surface that are opposite to each other, wherein the first microlenses are disposed on the light-incident surface, the light-exit surface, or a combination thereof according to a first distribution pattern, the second microlenses are disposed on the light-incident surface, the light-exit surface, or a combination thereof according to a second distribution pattern, and the first distribution pattern is different from the second distribution pattern;
a light sensor, comprising a photosensitive surface, wherein the photosensitive surface faces the light-exit surface of the light-transmitting film, there are a plurality of pixels on the photosensitive surface, and the pixels sense the first microlenses to obtain a first photosensitive image corresponding to the first distribution pattern and sense the second microlenses to obtain a second photosensitive image corresponding to the second distribution pattern; and
an image processor, coupled to the light sensor, wherein the image processor selectively performs, according to a first virtual image and the first photosensitive image, image processing of simulating a moiré effect to generate a first moiré image or selectively performs, according to a second virtual image and the second photosensitive image, image processing of simulating a moiré effect to generate a second moiré image, wherein the first virtual image corresponds to the first distribution pattern and is similar to the first photosensitive image, and the second virtual image corresponds to the second distribution pattern and is similar to the second photosensitive image.

2. The moiré image processing device according to claim 1, further comprising a memory, coupled to the image processor, wherein the memory pre-stores the first virtual image and the second virtual image, and the image processor reads the memory to obtain the first virtual image and the second virtual image.

3. The moiré image processing device according to claim 1, wherein the image processor performs preprocessing according to the first photosensitive image to obtain the first virtual image, and the preprocessing comprises image scaling, image rotation, or image shifting.

4. The moiré image processing device according to claim 1, wherein the first microlenses and the second microlenses are respectively irregularly arranged.

5. The moiré image processing device according to claim 1, wherein the first microlenses and the second microlenses are respectively regularly arranged.

6. The moiré image processing device according to claim 1, wherein the first microlenses are different from the second microlenses.

7. A moiré image processing device, comprising:
a light-transmitting film, comprising a plurality of microlenses, and a light-incident surface and a light-exit surface that are opposite to each other, wherein the microlenses are disposed on the light-incident surface, the light-exit surface, or a combination thereof according to a distribution pattern;
a light sensor, comprising a photosensitive surface, wherein the photosensitive surface faces the light-exit surface of the light-transmitting film, there are a plurality of pixels on the photosensitive surface, and the pixels sense the microlenses to obtain a photosensitive image corresponding to the distribution pattern; and
an image processor, coupled to the light sensor, wherein the image processor performs, according to a virtual image and the photosensitive image, image processing of simulating a moiré effect to generate a moiré image, wherein the virtual image corresponds to the distribution pattern and is similar to the photosensitive image.

8. The moiré image processing device according to claim 7, further comprising a memory, coupled to the image processor, wherein the memory pre-stores the virtual image, and the image processor reads the memory to obtain the virtual image.

9. The moiré image processing device according to claim 7, wherein the image processor performs preprocessing according to the photosensitive image to obtain the virtual image, and the preprocessing comprises image magnification, image rotation, or image shifting.

10. The moiré image processing device according to claim 7, wherein the microlenses are irregularly arranged.

11. The moiré image processing device according to claim 7, wherein the microlenses are regularly arranged.

12. The moiré image processing device according to claim 7, further comprising a light-transmitting membrane, wherein the light-transmitting membrane and the light-transmitting film are coaxially disposed, the light-transmitting membrane comprises a plurality of optical microlenses, the optical microlenses are disposed on a surface of the light-transmitting membrane according to another distribution pattern, the pixels of the light sensor sense the optical microlenses to obtain another photosensitive image corresponding to the another distribution pattern, and the image processor further performs, according to another virtual image and the another photosensitive image, image processing to generate another moiré image, wherein the another virtual image corresponds to the another distribution pattern and is similar to the another photosensitive image.

* * * * *